Oct. 8, 1957  R. N. HIXSON ET AL  2,809,334
CONTROL APPARATUS FOR STARTING TWO MOTORS
Filed Jan. 23, 1956  3 Sheets-Sheet 1
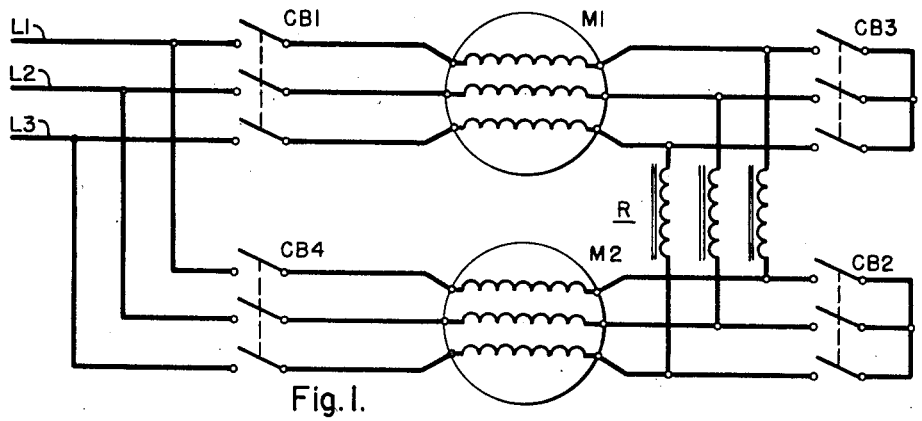
Fig. 1.
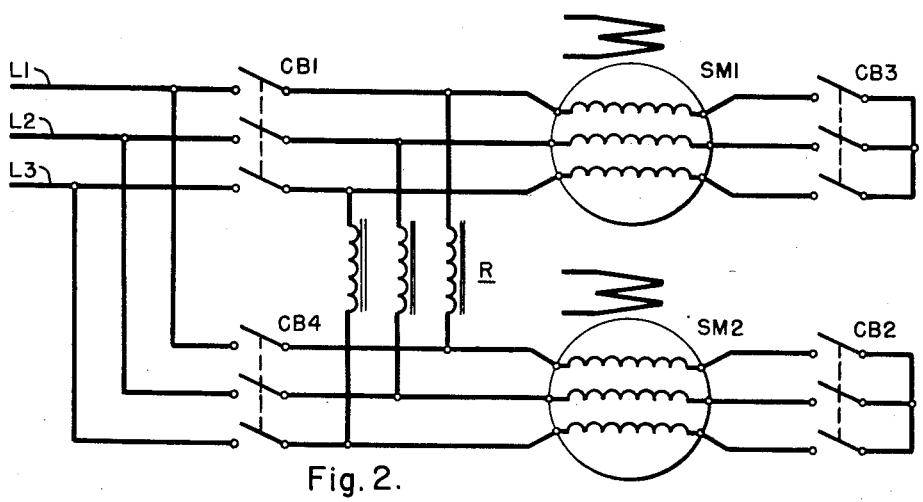
Fig. 2.
| Switch Number | M1 | | | M2 | | |
|---|---|---|---|---|---|---|
| | Off | Start | Run | Off | Start | Run |
| CB1 | | O | O | | O | O |
| CB2 | | O | | | | O |
| CB3 | | | O | O | | O |
| CB4 | | | | | O | O |
Fig. 3.
WITNESSES:
Bernard R. Gregory
Wm. B. Sellers
INVENTORS
Roy N. Hixson and
Charles P. Croco.
BY
Paul E. Friedemann
ATTORNEY ated Oct. 8, 1957

2,809,334

CONTROL APPARATUS FOR STARTING TWO MOTORS

Roy N. Hixson, Wilkinsburg, and Charles P. Croco, Mount Lebanon, Pa., assignors to Westinghouse Electric Corporation, East Pittsburgh, Pa., a corporation of Pennsylvania Application January 23, 1956, Serial No. 560,480

9 Claims. (Cl. 318—91)

This invention relates to a system of control for effecting the energization of two alternating current load units and more particularly it relates to systems of control for starting two alternating current motors in sequence.

It has heretofore been the practice, when a particular application required the use of two alternating motors which had to be started at low voltage and then run at full voltage, to interconnect a starting reactor with each of the motors and employ the necessary circuit breakers to effect the change in circuitry from the starting voltage to the running voltage. This arrangement required two separate starting reactors and, depending somewhat upon the manner in which the connection was to be effected, required from four to eight circuit breakers.

It is a broad object of this invention to utilize a single starting reactor and a minimum number of switching devices for effecting the sequential energization of two alternating current load units.

It is a more specific object of this invention to interconnect in one series circuit a pair of circuit breakers and one alternating current motor and another series circuit with another pair of circuit breakers and a second alternating current motor and interconnect the two series circuits thus formed by a starting reactor connected between the circuit breakers whereby proper sequential operation of the circuit breakers may effect low voltage starting of each motor with the use of one reactor.

It is another specific object of this invention to interconnect the primary windings of two induction motors with a starting reactor and interconnect a circuit breaker in each primary winding of the induction motor for shunting the starting reactor, whereby, by suitable connection of the motors to the source of supply and operation of the circuit breakers, low voltage starting and full voltage running for each of the motors may be effected by the use of one starting reactor.

A further broad object of this invention is the provision of means for effecting the starting of two alternating current motors by the use of a single starting reactor, thereby effecting a considerable saving in cost and a simplification of the control.

Other objects and advantages will become more apparent from a study of the following specification and the accompanying drawings, in which:

Figure 1 is a simplified showing of this invention in connection with the starting circuitry of two induction motors;

Fig. 2 is a simplified showing of this invention as applied to two synchronous motors;

Fig. 3 shows a sequence chart for the circuit breakers utilized in this starting system.

Referring to Fig. 1, it will be noted that one set of terminals of the primary windings of the induction motor M1 may at the left be directly connected to the supply lines L1, L2 and L3 by the circuit breaker, or switch means, CB1. Similarly, the corresponding terminals of the second induction motor M2 may have its primary windings at the left connected directly to the leads L1, L2, L3 by the switching means CB. The second set of terminals of the primary windings of the motors M1 and M2 are at the right interconnected as shown by the starting reactor R. Each primary winding of the motor is provided with a circuit breaker as the circuit breakers CB3 and CB2 for connecting the windings to common junctions.

In Fig. 2 the invention is shown as applied to a synchronous motor and for this purpose the reactor R is connected to the two series circuits, formed by circuit breakers CB1, CB3 and SM1 and the circuit breakers CB4, CB2 and SM2, between the circuit breakers CB1 and CB3 and CB4 and CB2.

To effect the starting at low voltage of, for example, motor M1, the circuit breakers CB1 and CB2 are operated substantially simultaneously connecting motor M1 to the reactor R and thus effecting a low voltage starting of motor M1. After a selected time interval, the circuit breaker CB3 may be closed and CB2 opened, thus connecting motor M1 directly to the source of supply for operation at full voltage.

Thereafter to effect starting of motor M2, circuit breaker CB4 may be closed and since circuit breaker CB3 is already closed, motor M2 will be started with the reactor R in its circuit, thus effecting low voltage starting. After motor M2 has obtained a selected speed, circuit breaker CB2 may be closed to operate motor M2 at full voltage.

For the starting of the synchronous motor, shown in Fig. 2, the sequence of operation for the circuit breakers would be the same if the reactor had the same position as indicated in Fig. 1. If the reactors are disposed as indicated in Fig. 2, then the sequence of operation of the circuit breakers would have to be changed as is evident from a study of Fig. 2.

Figure 4A:
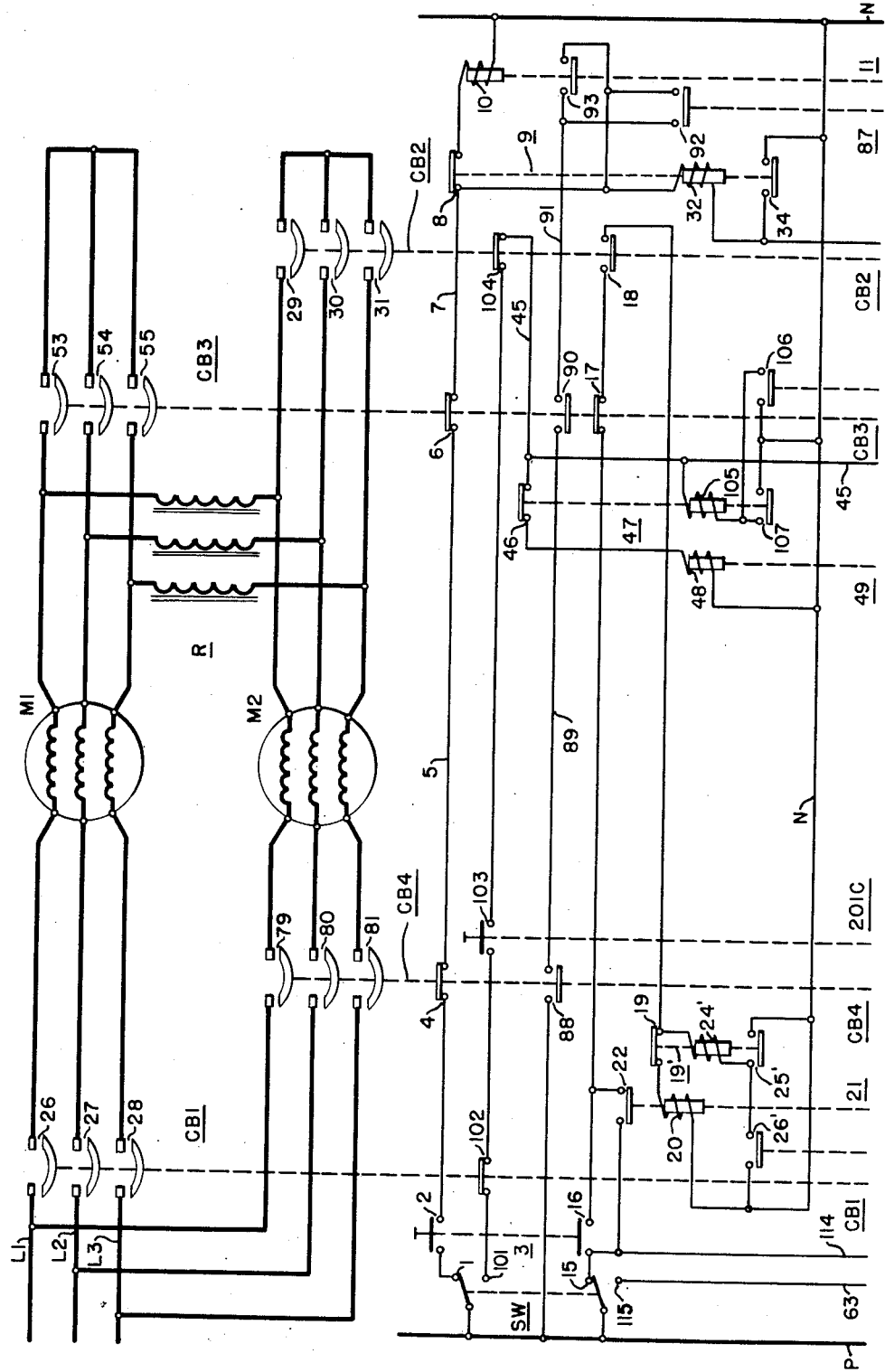
Figs. 4A and 4B together show the essential details of the system of control as applied to two induction motors.
Figure 4B:
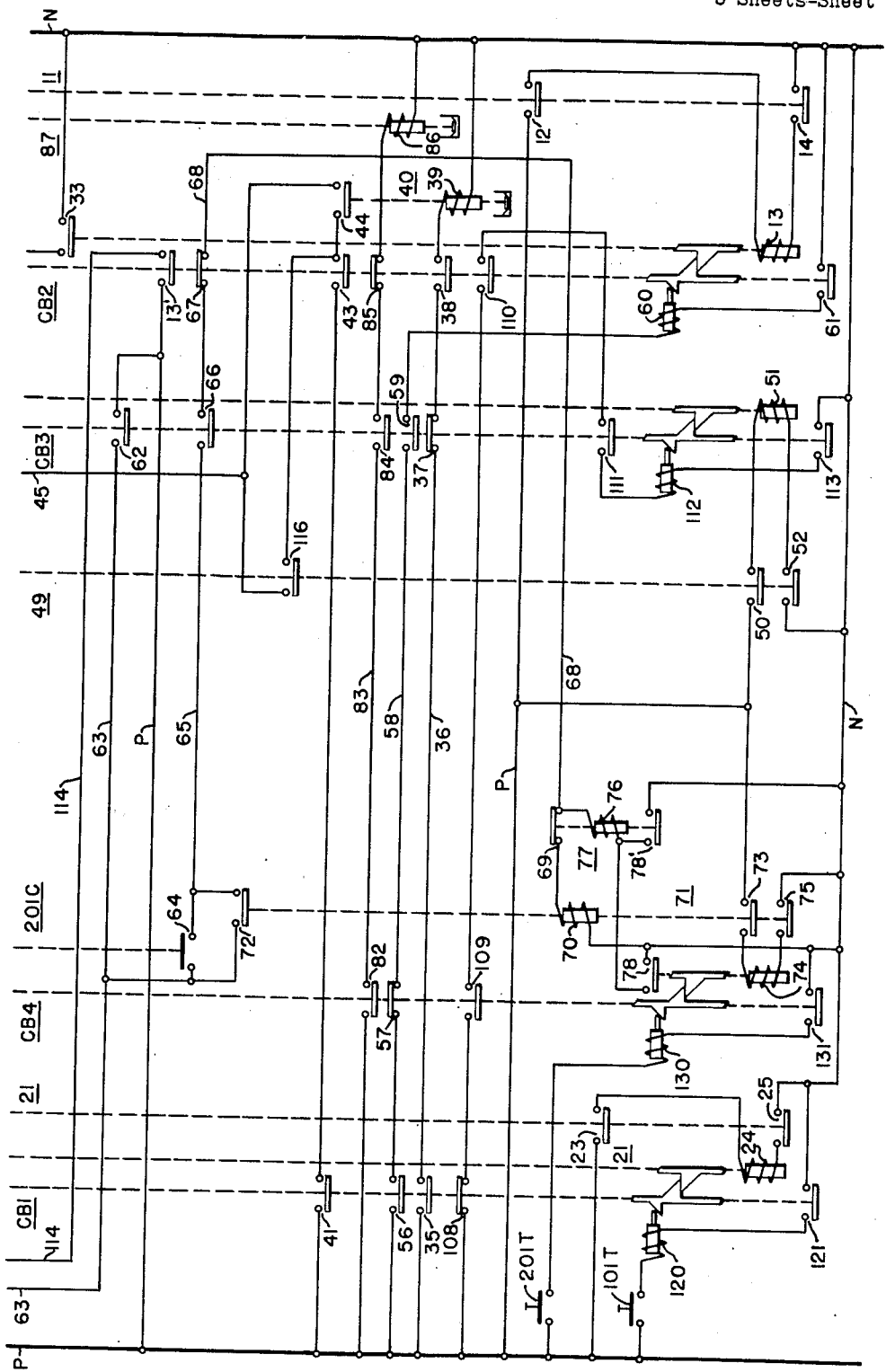

A better understanding of the details of this invention may be had and a better appreciation of its importance to the trade may be obtained from a study of the sequence of operation of the circuitry shown in Figs. 4A and 4B together. Assuming that alternating current buses, or terminals, L1, L2 and L3 are energized with alternating current and that the control buses P and N are suitably energized and that the attendant wishes to start motor M1 first, he thus positions the selector switch SW in its upper position, as shown, and thereafter depresses the starting switch 3 whereupon a circuit is established from the positive bus P through contacts 1 of the selector switch SW, contacts 2 of the push button 3, back contacts 4 of circuit breaker, or switch means CB4, conductor 5, back contacts 6 of circuit breaker CB3, conductor 7, back contact 8 of control relay 9, actuating coil 10 of the contactor 11 to the negative terminal N. Operation of the contactor 11 closes the contacts 93, 12 and 14. The closure of contacts 12 and 14 establishes a circuit from the positive conductor P through contacts 12, actuating coil 13 of circuit breaker CB2 and contacts 14 to negative bus N. The circuit breaker CB2 is thus actuated and effects the closing of contacts 29, 30, 31, 18, 33, 13', 43, 110, 61 and 38, and the opening of contacts 104, 67 and 85.

The closure of contact 18 establishes a circuit from the positive conductor P through contacts 15 of selector switch SW, contacts 16 of push button 3, back contacts 17 of circuit breaker CB3, contacts 18 of circuit breaker CB2, contacts 19 of control relay 19', actuating coil 20 of contactor 21 to the negative bus N. The operation of the contactor 21 effects the closing of contacts 22, 23 and 25 whereupon a circuit is established from the positive bus P through contacts 23 of the contactor 21, actuating coil 24 of circuit breaker CB1 and contacts 25 of contactor 21 to the negative bus N.

The operation of the circuit breaker CB1 effects the closing of contacts 26, 27, 28, 56, 26', 41, 35 and 121, and the opening of contacts 102 and 108. Since contacts 26, 27, 28, 29, 30 and 31 are closed, it is apparent that motor M1 is connected to the supply terminals L1, L2 and L3 through the reactor R and thus is supplied with low starting voltage for purposes of acceleration.

At the time of the closure of contacts 33, a circuit is established from energized conductor 7 through actuating coil 32 of control relay 9 and contacts 33 to the negative bus. This relay 9 thus operates to close its holding circuit through contacts 34 making the energization of coil 32 independent of the actuation of the circuit breaker CB2. At this stage of the starting operation it is apparent that the aim is to disconnect the reactor R after a selected time interval to allow acceleration of motor M1 and thereafter to close the circuit breaker CB3. This is effected through the time limit relay 40, which time limit relay is energized by a circuit from positive bus P through contacts 35 of circuit breaker CB1, conductor 36, back contacts 37 of circuit breaker CB3, contacts 38 of circuit breaker CB2, actuating coil 39 of time limit relay 40 to the negative bus N.

After a selected interval of time, contacts 44 close whereupon a circuit is established from the positive bus P through contacts 41 of circuit breaker CB1, contacts 43 of circuit breaker CB2, contacts 44, conductor 45, back contacts 46 of relay 47, actuating coil 48 of contactor 49 to the negative bus N. The operation of the contactor 49 effects the closing of contacts 116, 50 and 52. The closure of contacts 50 and 52 establishes a circuit from the positive bus P through contacts 50, actuating coil 51 of circuit breaker CB3, contacts 52 to the negative bus. Circuit breaker CB3 is thus operated effecting the closing of contacts 53, 54, 55, 90, 59, 106, 66, 62, 84, 111 and 113 and the opening of contacts 6, 17 and 37.

The closure of contacts 53, 54 and 55 connects motor M1 for full voltage operation. The closure of contacts 59 establishes a circuit from the positive bus P through contacts 56 of circuit breaker CB1, back contact 57 of circuit breaker CB4, conductor 58, contacts 59, trip coil 60 of circuit breaker CB2, and contacts 61 to the negative bus N. Circuit breaker CB2 is thus opened and the trip coil is immediately deenergized by the opening of contact 61.

If motor M2 is now to be started, it is not necessary to shift the selector switch SW to the lower position. It is only necessary to actuate the starting button 201C for the motor M2 whereupon a circuit is established from the positive bus P through contacts 62 on circuit breaker CB3, conductor 63, contacts 64 on the push-button switch 201C, conductor 65, contacts 66 on circuit breaker CB3, back contacts 67 of circuit breaker CB2, conductor 68, back contacts 69 of relay 77, actuating coil 70 of contactor 71 to the negative bus N. Operation of the contactor 71 effects the closing of contacts 72, 73 and 75. The closure of contact 72 makes the energization of conductor 65 independent of the position of the starting switch 201C and that switch may thus be released.

The closure of contacts 73 and 75 effects the energization of the actuating coil 74 for the circuit breaker CB4 which is thus actuated and effects the closing of contacts 79, 80, 81, 88, 82, 109, 78 and 131 and the opening of contacts 41 and 57. The closure of contacts 79, 80 and 81 connects motor M2 through the reactor R to the supply terminals L1, L2 and L3 since at this stage of operation contacts 53, 54 and 55 are closed. The closure of contacts 78 effects the energization of the actuating coil 76 of relay 77 which thereupon closes its holding contacts 78'. The contactor 71 is deenergized but that has no effect since the circuit breaker CB4 is held in closed position by its latch mechanism.

The closure of contacts 82 on circuit breaker CB4 establishes a circuit from the positive bus P through contacts 82, conductor 83, contacts 84 of circuit breaker CB3, contacts 85 of circuit breaker CB2, actuating coil 86 of the time limit relay 87. After a selected time interval, the time limit relay 87 effects the closing of contacts 92 whereupon a circuit is established from the positive bus P through contacts 88 of circuit breaker CB4, conductor 89, contacts 90 of circuit breaker CB3, conductor 91, contacts 92, back contacts 8 of the relay 9, which was, of course, deenergized by the opening of contact 6, and actuating coil 10 of contactor 11 to the negative bus N. Operation of contactor 11 effects the closure of circuit breaker CB2 in the same manner as hereinabove discussed. It is thus apparent that both motors now operate at full voltage and only one reactor and four circuit breakers were necessary to effect this starting operation, disregarding for the moment the rest of the control which would have to be present with any starting system, except that the control herein shown is especially arranged to effect a sequence of operation of the circuit breakers as hereinbefore discussed.

The operation of contacts 93 makes the energization of coil 10 independent of the time limit relay 87 and since the contacts 85 in series with the actuating coil 86 of time limit relay 87 are open, contacts 92 are also open.

If the attendant had intended to start the motor M2 first, he would have disposed the selector switch in the lower position, whereupon operation of the starting switch 201C for the second motor M2 would have established a circuit from the positive bus P through contacts 101 of the selector switch, back contacts 102 of circuit breaker CB1, contacts 103 of starting push button 201C, contacts 104 to the conductor 45 whereupon circuit breaker CB3 would be caused to operate in the same manner as hereinabove discussed. The operation of circuit breaker CB3, of course, effects the closing of contact 106 whereupon the relay 47 has its actuating coil 105 energized through contact 106 and effects the closing of contact 107 making the energization of coil 105 independent of the operation of the actuating coil 51 of circuit breaker CB3. The contactor 49 is deenergized and the actuating coil 51 is deenergized, but since the circuit breaker is held in by its latch mechanism, circuit breaker CB3 remains closed.

Since circuit breaker CB3 is operated, contacts 62 are closed whereupon a circuit is established from positive bus P through contacts 62, conductor 63, contacts 64 to conductor 65, contacts 66, contacts 67, conductor 68, contacts 69, actuating coil 70 of contactor 71 which thus effects the operation of circuit breaker CB4 as hereinabove discussed. Since the operation of the circuit breaker CB4 closes the contacts 82 and contacts 84 and 85 are closed, the time limit relay 87 is energized and thus effects the operation of circuit breaker CB2 after a selected interval of time in the same manner as hereinbefore discussed.

Since the circuit breaker CB1 is not operated but circuit breakers CB4 and CB2 have operated, a circuit is established from the positive bus P through the back contacts 108 of circuit breaker CB1, contacts 109 of circuit breaker CB4, contacts 110 of circuit breaker CB2, contacts 111 of circuit breaker CB3 which at this moment is still closed, the trip coil 112 and contacts 113 to the negative bus. The trip coil releases the circuit breaker CB3 opening the contacts 53, 54 and 55.

If the attendant now wishes to start motor M1, it is not necessary to shift the selector switch SW from the lowermost position, but it is necessary to push the push button 3 for the motor M1 whereupon a circuit is established from the positive bus P through contacts 13' on the circuit breaker CB2, conductor 114, contacts 16 on the push-button switch 3 through contacts 17, 18, 19 and actuating coil 20 of contactor 21 to the bus N. The circuit breaker CB1 is thus actuated and since the circuit breaker CB2 is closed, the motor M1 is connected to the supply terminals L1, L2 and L3 through the reactor R. The operation of circuit breaker CB1 closes contacts 35 and the time limit relay 40 is thus again energized which, after a selected interval of time, energizes conductor 45 to effect the operation of circuit breaker CB3 in the same manner as hereinabove discussed.

The trip coils for the circuit breakers CB2 and CB3 are, of course, automatically deenergized by the sequence of operation. There is no such automatic operation provided for the trip coils for the circuit breakers CB1 and CB4 since no such automatic operation is needed. However, since the circuit breakers will need to be open, the trip coils are energized by suitable action of the push-button switches 201T and 101T. The closure of push-button switch 101T energizes the trip coil 120 of circuit breaker CB1 through contact 121 to thus trip circuit breaker CB1 whereas the closure of push-button switch 201T energizes the trip coil 130 through the contacts 131 to thus trip circuit breaker CB4.

While the details of the control have been shown in connection with two induction motors, it is apparent that the control may be devised to suit the starting of synchronous motors and may also be arranged for the energization of two alternating current load units in the sequence specified without departing from the spirit of the invention shown and described.

We claim as our invention:

1. In an electric system of control for energizing two alternating current load units first at low voltage and then at full voltage from suitable terminals energized with alternating current, in combination, first, second, third and fourth switching means each of said switching means having left-hand contacts and right-hand contacts; first and second load units; a first series circuit including the first switching means, the first load unit and the third switching means; a second series circuit including the fourth switching means, the second load unit, and the second switching means; with each of the left-hand contacts of the first and fourth switching means being connected to one of said terminals; a voltage limiting reactor connected across the left-hand contacts of the second and third switching means, with each of the right-hand contacts of the second switching means being selectively connected to a common junction and with each of the right-hand contacts of the third switching means being connected to a common junction; and control means for effecting, in the order recited, the substantially simultaneous closure of the first and second switching means, then the closure and opening, respectively, of the third switching means and the second switching means, and then the closure of the fourth switching means, and subsequently the closure of the second switching means.

2. In an electric system of control for energizing one alternating current load unit first at low voltage and then at full voltage and thereafter energizing a second alternating current load unit first at low voltage and then at full voltage, in combination, first, second, third, and fourth switching means each having left-hand and right-hand contacts; first and second load units; a first series circuit including, in the order recited, the first switching means, the first load unit, and the third switching means; a second series circuit including, in the order recited, the fourth switching means, the second load unit, and the second switching means; suitable terminals energized with alternating current; the left-hand contacts of the first and fourth switching means being connected to said terminals; a voltage limiting reactor connected across the left-hand contacts of the second and third switching means, with each of the right-hand contacts of the second and third switching means being connected directly to a common junction; and means for effecting in the order recited, the substantially simultaneous closure of the first and second switching means, the substantially simultaneous closure and opening, respectively, of the third switching means and second switching means, the closure of the fourth switching means, and the closure of the second switching means.

3. In an electric system of control for energizing one alternating current load unit first at low voltage and then at full voltage and thereafter energizing a second alternating current load unit first at low voltage and then at full voltage, with both load units being energized from suitable teminals energized with alternating current; in combination, first, second, third, and fourth switching means each having left-hand and right-hand contacts; first and second load units; a first series circuit including the first switching means, the third switching means, and the first load unit; a second series circuit including the fourth switching means, the second switching means, and the second load unit; the left-hand contacts of the first and fourth switching means being connected to said terminals; a voltage limiting reactor connected across the left-hand contacts of the second and third switching means, with the right-hand contacts of each of the second and third switching means being connected to a common junction; and control means for effecting the substantially simultaneous closure of the first and second switching means, then the substantially simultaneous closure and opening, respectively, of the third switching means and second switching means, and then the closure of the fourth switching means, and subsequently the closure of the second switching means.

4. The subject matter of claim 2 with the provision of timing means, set in operation by the closure of the first and second switching means, to delay the closure and opening, respectively, of the third and second switching means.

5. The subject matter of claim 3 with the provision of timing means, set in operation by the closure of the fourth switching means, for delaying the second closure of the second switching means.

6. In an electric system of control for energizing first and second alternating current load units first at low voltage and then at full voltage from suitable terminals energized with alternating current, in combination, a first series circuit including at least two switching means and said first load unit, a second series circuit including at least two switching means and said second load unit, and voltage reducing reactor means connected between said two series circuits and with the connection to each of said series circuits being made across a corresponding one of said switching means in each of the two series circuits.

7. In a system of control for starting two alternating current motors, in combination, three terminals energized with three-phase alternating current, a voltage reducing reactor, two alternating current motors, four circuit breakers, and means for sequentially operating the first and second circuit breaker to closing position, the third to closing position and the second to open position, the fourth to closing position, and the second to closing position, with the circuitry, namely the circuit breakers, the motors, and the reactor, so disposed that the first operation connects the first motor to the supply terminals in circuit relation with the reactor to supply the first motor with a relatively low starting voltage, the second operation connects the first motor for full voltage operation, namely directly to the supply terminals, the third operation connects the second motor and reactor to the supply terminals to supply low starting voltage to the second motor, and the fourth operation connects the second motor for full voltage operation to the supply terminals.

8. In an electric system of control starting two alternating current motors in sequence with each motor being started at a relatively low starting voltage and then operated at full voltage, in combination, suitable terminals energized with alternating current; first, second, third, and fourth switching means each having right-hand contacts and left-hand contacts with the left-hand contacts of the first and fourth switching means being connected to said terminals; a first alternating current electric motor being connected across the right-hand contacts of the first switching means and the left-hand contacts of the third switching means; a second alternating current motor being connected between the right-hand contacts of the fourth switching means and the left-hand contacts of the second switching means; a voltage limiting reactor connected across the left-hand contacts of the second and third switching means; and circuit means for connecting the right-hand contacts of the second and third switching means to common junctions, respectively.

9. In an electric system of control starting two alternating current motors in sequence with each motor being started at a relatively low starting voltage and then operated at full voltage, in combination, suitable terminals energized with alternating current; first, second, third, and fourth switching means each having right-hand contacts and left-hand contacts with the left-hand contacts of the first and fourth switching means being connected to said terminals; a first alternating current electric motor; a second alternating current electric motor; a first series circuit including the first switching means, the first motor and the third switching means, with the first motor and third switching means being arranged in a selected order in the series circuit with reference to the first switching means; a second series circuit including the fourth switching means, the second motor, and the second switching means, with the second motor and second switching means being arranged in the same order in the second series circuit as the order of the arrangement of the first motor and the third switching means in the first series circuit, a voltage limiting reactor connected across the left-hand contacts of the third and second switching means; and means for effecting the operation of said switching means in a selected order.

References Cited in the file of this patent

FOREIGN PATENTS 258,960     Switzerland _ _ _ _ _ _ _ _ _ _ _ _ Dec. 31, 1948